(12) United States Patent
Basu et al.

(10) Patent No.: US 11,930,100 B2
(45) Date of Patent: Mar. 12, 2024

(54) FUND CONVERSION BETWEEN BLOCKCHAINS

(71) Applicant: 0Chain Corp., Cupertino, CA (US)

(72) Inventors: Saswata Basu, Cupertino, CA (US); Thomas Howard Austin, San Jose, CA (US)

(73) Assignee: 0CHAIN CORP., Cupertino, CA (US)

( * ) Notice: Subject to any disclaimer, the term of this patent is extended or adjusted under 35 U.S.C. 154(b) by 394 days.

(21) Appl. No.: 17/349,833

(22) Filed: Jun. 16, 2021

(65) Prior Publication Data

US 2021/0314397 A1    Oct. 7, 2021

(51) Int. Cl.
| | |
|---|---|
| H04L 29/06 | (2006.01) |
| G06Q 20/06 | (2012.01) |
| G06Q 20/22 | (2012.01) |
| H04L 9/06 | (2006.01) |
| H04L 9/08 | (2006.01) |
| H04L 9/32 | (2006.01) |
| H04L 9/40 | (2022.01) |
| H04L 67/104 | (2022.01) |
| H04L 9/00 | (2022.01) |

(52) U.S. Cl.
CPC .......... *H04L 9/0637* (2013.01); *G06Q 20/06* (2013.01); *G06Q 20/0658* (2013.01); *G06Q 20/223* (2013.01); *H04L 9/0643* (2013.01); *H04L 9/0841* (2013.01); *H04L 9/0894* (2013.01); *H04L 9/3236* (2013.01); *H04L 9/3297* (2013.01); *H04L 63/1466* (2013.01); *H04L 67/1059* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | | |
|---|---|---|---|---|
| 2018/0091316 | A1* | 3/2018 | Stradling | ............... H04L 9/3297 |
| 2018/0227118 | A1* | 8/2018 | Bibera | .................. H04L 63/102 |

FOREIGN PATENT DOCUMENTS

| | | | | | |
|---|---|---|---|---|---|
| BR | 112019004571 | A2 * | 6/2019 | ............. | G06F 16/27 |

\* cited by examiner

*Primary Examiner* — Andrew J Steinle
(74) *Attorney, Agent, or Firm* — Levine's Tech Consulting LLC; Frank E. Levine

(57) ABSTRACT

An approach is disclosed for running a first smart contract on a first blockchain platform which restricts access to a client's funds appropriated to a second smart contract running on a second blockchain platform. A transaction is received by invoking the first smart contract authorizing the second smart contract. In response to receiving an indication of a successful completion of the first smart contract, a plurality of client's authorization tickets are sent to the second smart contract which restricts access to the client's funds appropriated to the second smart contract running on the second blockchain platform. The invoked smart contract receives the set of authorization information and records the set of authorization information. After receiving a set of authenticated authorization tickets exceeding a predetermined threshold, the funds are atomically eliminated on the first blockchain platform and a converted funds generated on the second blockchain platform.

28 Claims, 7 Drawing Sheets

Split key is kept across devices
200

Split key 1 for laptop
220

Split key 2 for phone
230

"Some passphrase kept secret"
210

User
290

PIN (1234)
240

User needs to keep private key (passphrase) secure
User can receive transactions
To send transactions, user needs laptop and mobile
215

Yes/No
Approve/Disapprove
260

FUND CONVERSION BETWEEN BLOCKCHAINS

If an Application Data Sheet (ADS) has been filed for this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

CROSS-REFERENCE TO RELATED APPLICATIONS

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application constitutes a utility application related to and claims the benefit of priority from U.S. Provisional Patent Application No. 62/707,177 filed on Oct. 24, 2017.

BACKGROUND

The present invention relates to a computing environment, and more particularly to running a first smart contract on a first blockchain platform restricting access to a client's funds appropriated to a second smart contract running on a second blockchain platform.

SUMMARY

According to one embodiment of the invention, there is a method that includes a processor and a local storage device accessible by the processor running a first smart contract on a first blockchain platform restricting access to a client's funds appropriated to a second smart contract running on a second blockchain platform. A transaction is received by invoking the first smart contract authorizing the second smart contract. In response to receiving an indication of a successful completion of the first smart contract, a plurality of client's authorization tickets are sent to the second smart contract.

According to one embodiment of the invention, there is a method that includes a processor and a local storage device accessible by the processor running a first smart contract on a first blockchain platform restricting access to a client's funds appropriated to a second smart contract running on a second blockchain platform. The invoked smart contract receives the set of authorization information and records the set of authorization information. After receiving a .a set of authenticated authorization tickets exceeding a predetermined threshold, the funds are atomically eliminated on the first blockchain platform and a converted funds generated on the second blockchain platform According to one embodiment of the invention, there is provided an information handling system including at least one processor executing instructions implementing steps of the method that executes processor running a first smart contract on a first blockchain platform restricting access to a client's funds appropriated to a second smart contract running on a second blockchain platform.

According to one embodiment of the invention, there is provided an information handling system including at least one processor executing instructions implementing steps of the method running a first smart contract on a first blockchain platform restricting access to a client's funds appropriated to a second smart contract running on a second blockchain platform.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Figure 1:
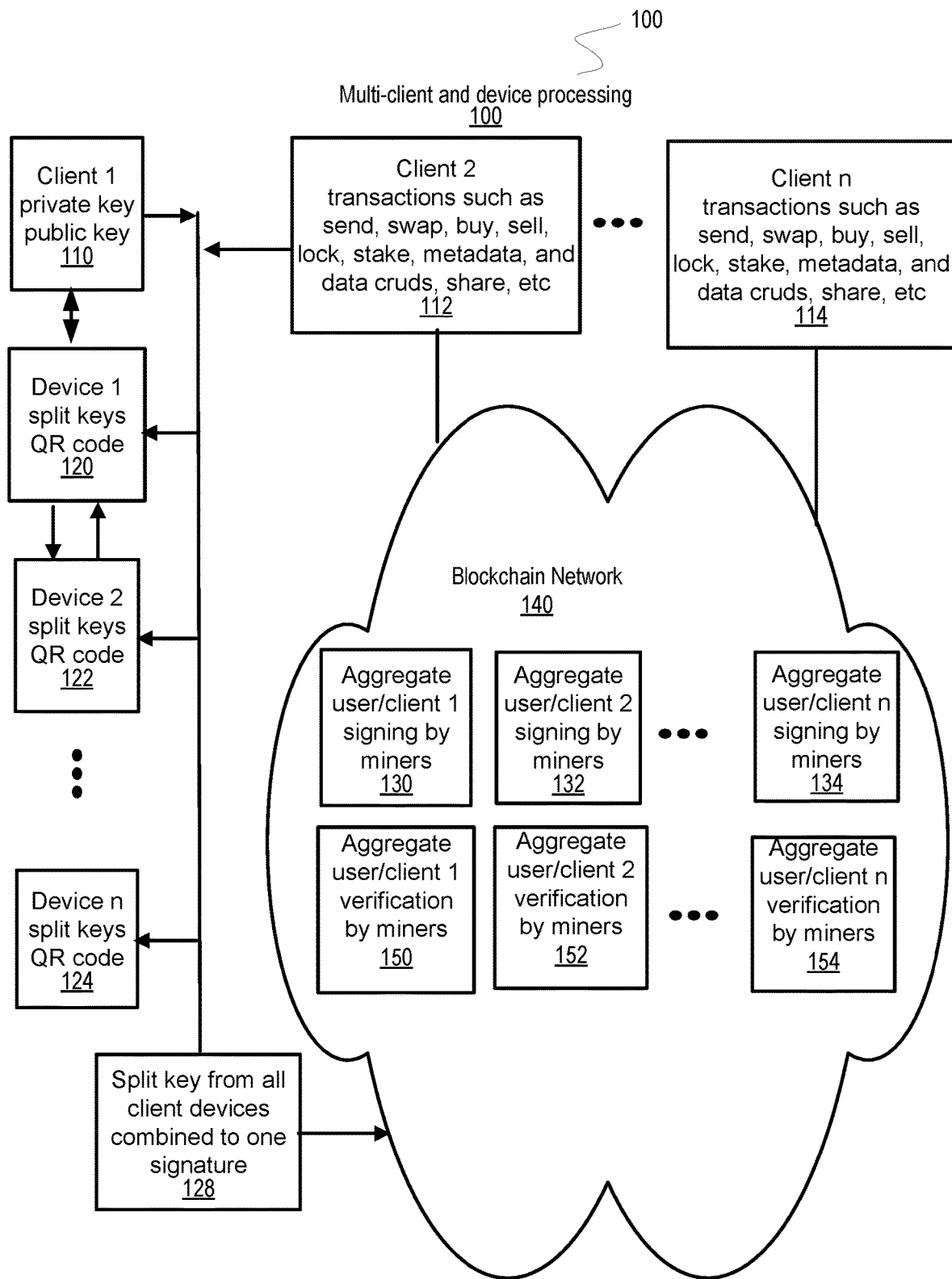
FIG. 1 illustrates an embodiment of blockchain system depicting multi-client and device processing.

Blockchain technology, sometimes also referred to as "blockchain," is a particular type of distributed database. Blockchains can theoretically be used to store any type of data or content, but are particularly well-suited to environments in which transparency, anonymity, and verifiability are important considerations. Examples include financial projects, such as cryptocurrencies, auctions, capital management, barter economies, insurance lotteries, and equity crowd sourcing.

A blockchain, originally block chain, is a growing list of records, called blocks, that are linked using cryptography. Each block contains a cryptographic hash of the previous block, a timestamp, and transaction data (generally represented as a Merkle tree). The Merkle tree is a hash-based data structure that is a generalization of the hash list. It is a tree structure in which each leaf node is a hash of a block of data, and each non-leaf node is a hash of its children. Typically, Merkle trees have a branching factor of 2, meaning that each node has up to 2 children.

By design, a blockchain is resistant to modification of its data. This is because once recorded, the data in any given block cannot be altered retroactively without alteration of all subsequent blocks. For use as a distributed ledger, a blockchain is typically managed by a peer-to-peer network collectively adhering to a protocol for inter-node communication and validating new blocks. Although blockchain records are not unalterable, blockchains may be considered secure by design and exemplify a distributed computing system with high Byzantine fault tolerance. A Byzantine fault is a condition of a computer system, particularly distributed computing systems, where components may fail and there is imperfect information on whether a component has failed. The blockchain has been described as "an open, distributed ledger that can record transactions between two parties efficiently and in a verifiable and permanent way."

The technology is perhaps most easily understood through a simple and familiar example, such as "Bitcoin," a cryptocurrency. A cryptocurrency is not entirely dissimilar from conventional currencies and, like a traditional currency, is essentially a medium of exchange. Traditional currencies are represented by a physical object paper currency or minted coins, for example—which is "spent" by physically delivering it in the proper denominations to a recipient in exchange for a good or service.

However, for long-distance transactions, such as buying goods or services over the Internet, direct physical delivery is not feasible. Instead, the currency would have to be mailed to the recipient. However, this carries a very high risk of fraud. The recipient may simply keep the money and not deliver the purchased good or service, leaving the buyer without recourse. Instead, on-line transactions are typically carried out using electronic payment systems in which the transaction is processed, validated, and mediated by a trusted third party. This third party may be a bank, as in the case of a debit or credit card, or a third party service functioning as an escrow agent. Crypto currencies operate on this same principle, except that instead of using a financial institution or other third party to facilitate the transaction, the transaction is verified through a consensus reached via cryptographic proof.

Internet is a global computer network providing a variety of information and communication facilities, comprising interconnected networks using standardized communication protocols. Internet is not owned by a single entity and it operates without a central governing body. The same principles of distributed governance were applied to digital currencies by providing ability to perform digital transactions that existed without support from any underlying institution. The digital ledger that records the transactions in a chain using a mathematical hierarchy is called a blockchain.

The current blockchain platform and related applications known to the industry fall short in multiple ways. First, there is no separation of roles on the blockchain based on the role of an entity for a given transaction. Each transaction follows a strict chain of rules and is dependent on its preceding transaction. If one transaction fails, all subsequent transactions on the blockchain become unusable. The computing time and built in delay in any blockchain platform is dependent on the available computing resources of its nodes. In absence of a role model, a single node has several computing intense tasks that are slow to execute. A slow system becomes vulnerable and becomes open to attacks. The current solutions do not allow for client flexibility in developing distributed applications with immutability and finality of transactions on a blockchain platform.

In order to overcome the deficiencies of the prior art, various methodologies are disclosed where an infrastructure is supplied to enable usage of the disclosed methodology. In an embodiment, application programming interfaces (API) are provided to handle the details where examples are available on the first blockchain platform. For this disclosure, high level descriptions of the details are discussed which should be adequate for those with ordinary skill in the art to implement solutions. In this disclosure, support for the identified features may be identified as modules in the blockchain platform with embodiments as described herein embedded in the modules. Access to functions in the modules are typically supported by documented APIs and may be available for common usage.

The following definitions generally apply to this disclosure and should be understood in both the context of client/server computing generally, as well as the environment of a blockchain network. These definitions, and other terms used herein, should also be understood in the context of leading white papers pertaining to the subject matter. These include, but are not necessarily limited to, Bitcoin: A Peer-to-Peer Electronic Cash System (Satoshi Nakamoto 2008). It will be understood by a person of ordinary skill in the art that the precise vocabulary of blockchains is not entirely settled, and although the industry has established a general shared understanding of the meaning of the terms, reasonable variations may exist.

The term "network" generally refers to a voice, data, or other telecommunications network over which computers communicate with each other. The term "server" generally refers to a computer providing a service over a network, and a "client" generally refers to a computer accessing or using a service provided by a server over a network. The terms "server" and "client" may refer to hardware, software, and/or a combination of hardware and software, depending on context. The terms "server" and "client" may refer to endpoints of a network communication or network connection, including but not necessarily limited to a network socket connection. A "server" may comprise a plurality of software and/or hardware servers delivering a service or set of services. The term "host" may, in noun form, refer to an endpoint of a network communication or network (e.g., "a remote host"), or may, in verb form, refer to a server providing a service over a network ("hosts a website"), or an access point for a service over a network. It should be noted that the term "blockchain network" as used herein usually means the collection of nodes interacting via a particular blockchain protocol and ruleset. Network nodes are the physical pieces that make up a network. They usually include any device that both receives and then communicates information. But they might receive and store the data, relay the information elsewhere, or create and send data instead.

The term "asset" means anything that can be owned or controlled to produce value.

The term "asymmetric key encryption," also known as "public key encryption," "public key cryptography," and "asymmetric cryptography," means a cryptographic system that uses pairs of mathematically related keys, one public and one private, to authenticate messages. The "private key" is kept secret by the sending of a message or document and used to encrypt the message or document. The "public key" is shared with the public and can be used to decrypt the message or document.

The term "ledger" means the append-only records stored in a blockchain. The records are immutable and may hold any type of information, including financial records and software instructions.

The term "blockchain" means a distributed database system comprising a continuously growing list of ordered records ("blocks") shared across a network. In a typical embodiment, the blockchain functions as a shared transaction ledger.

The term "transaction" means an asset transfer onto or off of the ledger represented by the blockchain, or a logically equivalent addition to or deletion from the ledger.

The term "blockchain network" means the collection of nodes interacting via a particular blockchain protocol and rule set.

The term "nonce" means an arbitrary number or other data used once and only once in a cryptographic operation. A nonce is often, but not necessarily, a random or pseudo-random number. In some embodiments, a nonce will be chosen to be an incrementing number or time stamp which is used to prevent replay attacks.

The term "block" means a record in a continuously growing list of ordered records that comprise a blockchain. In an embodiment, a block comprises a collection of confirmed and validated transactions, plus a nonce.

The term "hash" means a cryptographic algorithm to produce a unique or effectively unique value, properly known as a "digest" but sometimes informally referred to itself as a "hash," usually from an arbitrary, variable-sized input. Hashes are repeatable and unidirectional, meaning the algorithm always produces the same digest from the same input, but the original input cannot be determined from the digest. A change to even one byte of the input generally results in a very different digest, obscuring the relationship between the original content and the digest. SHA256 (secure hash algorithm) is an example of a widely used hash.

The term "mining" means the process by which new transactions to add to the blockchain are verified by solving a cryptographic puzzle. In a proof-of-work and proof-of-stake blockchain network, mining involves collecting transactions reported to the blockchain network into a "block," adding a nonce to the block, then hashing the block. If the resulting digest complies with the verification condition for the blockchain system (i.e., difficulty), then the block is the next block in the blockchain.

The term "miner" refers to a computing system that processes transactions. Miners may process transactions by combining requests into blocks. In embodiments, a miner has a limited time, for example, 15-50 milliseconds, to produce a block. Not all miners generate blocks. Miners that generate blocks are called "generators." Miners may be ranked and chosen to perform transactions based on their ranking. Some limited number of miners may be chosen to perform validation. All miners must be registered on the blockchain.

Messages representing generated blocks are sent to all miners by identifying the block with a block hash, transaction hash, and a signature of the minor producing the block. The miners receiving the messages replay the transactions for the block and sign an authentication message. If there is enough miners authenticating the block, consensus ticket it signed. In some embodiments a 2/3+1 agreement or 67% agreement is needed to generate the consensus ticket.

The term "sharder" refers to a computing system that that keeps tracks of its blockchain history. They are a single source of truth regarding any given transaction.

The term "transaction fee" means a fee imposed on some transactions in a blockchain network. The amount of the transaction fee is awarded to the miner who successfully mines the next block containing that transaction.

The term "wallet" means a computer file or software of a user that allows a user of a blockchain network to store and spend cryptocurrency by submitting transactions to the blockchain network. A wallet is usually itself protected by cryptography via a private key.

The term "consensus" refers to a computational agreement among nodes in a blockchain network as to the content and order of blocks in the blockchain.

The term "digital signature" means a mathematically-based system for demonstrating the authenticity of a message or document by ensuring that it was sent from the identified sender and not tampered with by an intermediary. Blockchains generally use asymmetric key encryption to implement digital signatures.

The term "fork" means a split in a blockchain where two different valid successor blocks have been mined and are present in the blockchain, but consensus has not yet been reached as to which fork is correct. This type of fork is also referred to as a "soft fork," and is automatically resolved by consensus over time. A "hard fork" is the forced imposition of a fork by manual intervention to invalidate prior blocks/transactions, typically via a change to the blockchain rules and protocol.

The term "cryptocurrency" (or "crypto") is a digital currency that can be used to buy goods and services, but uses an online ledger with strong cryptography to secure online transactions. Much of the interest in these unregulated currencies is to trade for profit, with speculators at times driving prices skyward. There are currently many different types of cryptocurrencies offered by many different blockchain implementations. The usage of any given cryptocurrency may be represented herein as "tokens."

The term "genesis block" means the very first block in a blockchain, that is, the root of the Merkle tree.

The term "proof-of-stake" means a mining system in which the production and verification of a block is pseudo-randomly awarded to a candidate miner, or prioritized list of candidate miners, who have invested a valuable stake in the system which can be collected by the blockchain network if the produced block is later deemed invalid. The stake functions as a deterrent against fraudulent blocks.

The term "proof-of-work" means a mining system in which the difficulty of finding a nonce that solves the cryptographic puzzle is high enough that the existence of a block compliant with the verification rules is itself sufficient proof that the block is not fraudulent.

The term "smart contracts" means computer programs executed by a computer system that facilitate, verify, or enforce the negotiation and performance of an agreement using computer language rather than legal terminology. Smart contracts may be verified and executed on virtual computer systems distributed across a blockchain.

The terms "web," "web site," "web server," "web client," and "web browser" refer generally to computers programmed to communicate over a network using the HyperText Transfer Protocol ("HTTP"), and/or similar and/or related protocols including but not limited to HTTP Secure ("HTTPS") and Secure Hypertext Transfer Protocol ("SHTP"). A "web server" is a computer receiving and responding to HTTP requests, and a "web client" is a computer having a user agent sending and receiving responses to HTTP requests. The user agent is generally web browser software.

The terms "erasure code" is a forward error correction (FEC) code under the assumption of bit erasures (rather than bit errors), which transforms a message of k symbols into a longer message (code word) with n symbols such that the original message can be recovered from a subset of the n symbols. The fraction r=k/n is called the code rate.

The term "database" means a computer-accessible, organized collection of data, which may be referred to as "content" in this document. Databases have been used for decades to format, store, access, organize, and search data. Traditionally, databases were stored on a single storage medium controlled by a single computer processor, such as a fixed disk or disk array. However, databases may also be organized in a "distributed" fashion, wherein the database is stored on a plurality of storage devices, not all of which are necessarily operated by a common processor. Instead, distributed databases may be stored in multiple component parts, in whole or part, dispersed across a network of interconnected computers.

The term "Difficulty" means proof-of-work mining, or the expected total computational effort necessary to verify the next block in a blockchain. Difficulty is generally determined by the verification rules of the blockchain and may be adjusted over time to cause the blockchain to grow (e.g., new blocks to be verified and added) at a desired rate. For example, in the Bitcoin blockchain network, the difficulty adjusts to maintain a block verification time of about ten minutes across the blockchain network.

It will be understood by one of ordinary skill in the art that common parlance in the computing industry refers to a "user" accessing a "site." This usage is intended to represent technical access to an online server by a user via a user computer. That is, the reference to a "user" accessing a "server" refers to the user manipulating or otherwise causing client software to communicate over a telecommunications network with server software. This also typically means that the user's client software is running on a client computer system and accessing the server computer system remotely. Although it is possible that a user may directly access and use the server via the server hardware, and without use of a client system, this is not the typical use case in a client/server architecture.

One of the major concerns related to the blockchain technology is scalability and in general efficiency/reliability of the whole operation. For instance, every user in this community, sooner or later, directly or indirectly, is forced to deal with challenges of maintaining and managing the cryptographic keys that are used. The subtleties and challenges involved in key generation, maintenance and management are well known in security industry and both cryptographic and policy based solutions have been devised in the past. However, in the context of cryptocurrencies, there are no satisfactory solutions that would help scalability or ease of use. The second major concern is related to computational efficiency of the tasks performed during the execution of the protocols. One of the most computationally intense and most frequently used cryptographic primitives in blockchain technology is digital signatures. The users need to generate every transaction with appropriate authentication done on the transaction and the miners or validators need to verify/validate the same multiple number of times.

In order to handle the challenges and complexities of key management, a number of techniques were proposed and deployed in different cryptocurrencies. In Bitcoin core, the keys are maintained in local storage. A typical user has access to a wallet software and uses the wallet to authenticate transactions being generating. As wallets generate the digital signature, the wallet requires an access to the private key of the user. While this speeds up the wallet operations, the presence of a key for a long time in a system that is online increases its vulnerability. Off-line storage and air gapped storages may be used. Password protected wallets are deployed by certain systems but they do not provide any security against a malware that might read the key strokes etc. Third party hosted wallets are also suggested to remove the pains of key management to a novice user but that usage requires enormous amount of trust in a third party.

In view of the shortcomings of the existing systems, a simple, easy to implement, secure approach to key generation that offers protections against theft/loss of the systems is disclosed. Given that a typical user may have several devices (at least two, say a laptop and a mobile phone/notepad), the "the private key" is split into several components with each component stored on each device. The objective is to have adequate protection: 1) In the case of a loss or corruption of a component of a key. 2) In the case of loss/theft of the device and subsequent abuse of the key component available in the device. 3) Signature generation must involve all the split components. 4) The individual components of the signatures generated in each device is secure on its own and does not lead to any attacks and key exposure.

The (BLS) short signature scheme of Boneh, Lynn and Shacham is quite amenable for such split-ups in which an effective split-up be achieved. Such split-up is not possible in Schnorr signature or Elliptic Curve Digital Signature Algorithm (ECDSA) without sharing information between the two devices that generate the partial signatures.

The transaction generation as well as the block formation/validation involve running computationally intense signing and verification algorithms. Typically, the block size is kept small by design in order to speed up the communication and in small blocks, it is observed that signatures occupy a significant amount of space. For example, it is estimated that nearly 40% of the transcript space is occupied by signatures in case of bitcoin. The computations involved in some of the deployed signature schemes are found to be very complex. For instance, the most widely used Elliptic Curve Digital Signature Algorithm (ECDSA) combines the long term and short term keys in a non-linear fashion and that directly contributes to its inefficiency. Moreover, each block formation calls for verification of a number of signatures (the signatures found in the transactions chosen for pooling) and when the block is broadcast, again the validation process calls for huge number of signature verifications at every node of the network. In this context, aggregate verification offers an efficient solution. In signature aggregation/verification, several signatures are combined into one "super" signature and verification is only performed on the super signature rather than on the individual signature. This leads to a dramatic drop in the verification cost of n signatures to the cost of verifying one signature. This clearly saves space and a significant amount of computing time. In an embodiment, the aggregation of the signatures may be done by the miners generating the block (generator), so that the miners doing the verification (verifier) doesn't have to verify each signature but just verifies the aggregate block signature to reduce compute time.

TABLE 1

Split-key Algorithm

| BLS Keys | Device 1 | Device 2 |
|---|---|---|
| Private Key: $x \in \mathbb{Z}_q^*$ <br> Public key: $X = xP$ <br> $\sigma = xH(m)$ | | |
| | Accept mnemonic$_1$ <br> $x_1 = H_1(mnemonic_1)$ <br> $x_2 = x - x_1$ <br> Store $x_1$ and $x_2P$ <br> Send $x_2$ to device 2 | |
| | | Accept Passcole <br> $s_1 = x_2 - H_1(Passcode)$ <br> Store $s_1$ |

TABLE 2

Signing Workflow

| Device 2 | Device 1 |
|---|---|
| Accept Passcode <br> $x_2 = s_1 + H_1(Passcode)$ <br> $\sigma_2 = x_2 H(m)$ <br> Send $\sigma_2$ to device 1 | |
| | Check if $\hat{e}(\sigma_2, P) \stackrel{?}{=} \hat{e}(H(m), x_2P)$ <br> $\sigma = x_1H(m) + \sigma_2 = x_1H(m) + x_2H(m)$ <br> $= xH(m)$ <br> Output $\sigma$ as the signature for m |

In an embodiment, the split-key wallet protocol uses a Boneh-Lynn-Shacham (BLS) signature scheme that is based on bi-linear pairings. A pairing, defined as e(,), is a bilinear map of 2 groups G1 and G2 in some other group, GT. e(,) takes e as arguments points in G1 and G2.

Pairings that verifies a signature have the form: e(g1, sig)=e(pk, H(m))

(in expanded form: e(g1, sk*H(m))=e(sk*g1, H(m))=e(g1, sk*H(m))

H(m) is hashing a message to a point on an elliptic curve.
BLS has:
KeyGen—choose a random a. Given generator g1, pk=α*g1
Sign—σ=α*H(m)∈G2 (in the case of eth2.0)
Verify(pk,m, σ)—if e(g1, σ)=e(pk, H(m)) return true.

The BLS signature scheme may be used to split keys and let users interact using crypto keys via a blockchain. Since the cryptocurrency balance is maintained against these keys, it's very important to protect the private key. The private key may be split into two secondary keys, storing each of the secondary key on a different device. Signing requires individual signatures from each device. Hence, losing any one device can still protect the primary key. In addition, if desired, one of the secondary keys can be further split into two parts; only one of which is stored on the device and the other may be a simple PIN that the user has to enter each time. This provides an extra layer of protection in case both devices are compromised. In this scheme, it is easy to generate as many split keys as desired providing the ability for the user to periodically rotate the split keys and in the process change the PIN.

With cryptocurrency, some quantity of tokens may be locked. In an embodiment, support may be provided for selling the cryptocurrency by specifying a name for locks, keys to the locks, how long each key is valid (from seconds to centuries), a number of keys, a price of the keys. Tokens acquired may be "locked" for the time each key is valid.

The actual verification is done by a group of machines called the validators. The validators can be any group of machines, depending on what makes sense in the blockchain ecosystem. Validators are mutually untrusting. In an embodiment, the validators may be a distinct group of machines from the miners and blobbers.

At a high level, the challenge protocol involves three phases: 1) The mining network randomly selects the blobber data allocation to be challenged. This process also specifies the validators who will verify the challenge and provides a random seed to be used for the challenges. This stage is referred to as the challenge issuance. 2) In the justification phase, the blobber broadcasts the data to the validators along with the metadata needed to verify the challenge. 3) Finally, in the judgment phase, the validators share their results. Once the validators have agreed on the results of the challenge, they write a transaction to the blockchain indicating whether the test passed. This transaction also pays the validators and rewards the blobber.

Selecting validators is a particular challenge. In a cronyism attack, a blobber sends the data to a friendly validator who approves all challenges without validating the data. In an extortion attack, a validator demands additional compensation from the blobber in exchange for passing the challenge.

These attacks are avoided by having the mining network randomly select a set of validators. For a challenge to pass, at least N validators must approve the results of the challenge. The difference between these values must be narrow enough to make a successful cronyism attack unlikely, but high enough to prevent an extortion attack. An additional concern is that the validators actually do the verification work. A validator who does not do the work but who attempts to collect the reward is called a freeloader.

Challenge Issuance Phase: The mining network must initially post a transaction to the network by randomly challenging a blobber providing storage. This challenge issuance transaction may include: 1) The allocation of data challenged, identified by allocation_id. Note that this should implicitly identify which blobber is challenged. 2) The list of eligible validators. 3) A random seed, which determines the indices of the data blocks in that allocation that the blobber must provide. 4) The latest write marker at the time of the challenge. Conceptually, this challenge issuance transaction is comparable to a roulette wheel, where the number of tokens currently due to the blobber from its challenge pool dictates its number of slices on the wheel. An alternate approach would be to use the size of the data allocation instead, but this can lead to a subtle attack. A blobber could post an agreement for a negligible price with itself as the client, and then commit to storing large amounts of easily regenerated data. With a commitment to a large enough amount of data, other blobbers would be challenged only with a low probability. By tying the probability of being challenged to the amount of tokens in the challenge pool, this attack becomes prohibitively expensive to carry out. The initial transaction essentially locks a portion of the blobber's stake and reward in a sub-pool specific to this challenge. A "guilty until proven innocent" approach is used to prevents a blobber from attempting a denial-of-service attack against a validator in order to avoid punishment. If the blobber never satisfies the challenge, the tokens are effectively burned.

Justification Phase: When the blobber observes the challenge issuance on the blockchain, it broadcasts its proof of storage to the validators with: The file system metadata. The write marker proving that file system contents match what is stored on the blockchain. The challenged blocks of data are chosen pseudo randomly using the miner's random seed and the Merkle paths of those data blocks.

Once the validators receive the blobber's data, they each verify the data that they have been sent. The validator verifies that: The file system metadata is valid. The file system root hash matches the write marker. The write marker matches the most recent commitment to the blockchain. At this point, the validator has established that the blobber's metadata is valid and matches the blockchain. The validator then calculates the number of blocks on the system from the allocation size. Using the random seed, the validator verifies that the blobber's blocks correspond with the pseudorandom sequence. (This serves to make every block of data on the system equally likely to be challenged, and ensures that the blobber did not try to game the results).

For each data block, the blobber verifies that the Merkle path matches up to the file metadata. As part of this process, the validator stores the two penultimate hashes of the Merkle tree; that is, it stores the two hashes that can be hashed together to give the file's Merkle root. These two hashes are called the validation proof.

At most one of the hashes in the validation proof should have been provided by the blobber. (To ensure this behavior, the inclusion of additional hashes on the Merkle path is an automatic failure.) Therefore, the validator must have done the work to calculate at least one of the two hashes. This validation proof can be verified easily by the other validators. These proofs are an important part of the disclosed defense against freeloaders.

Judgment Phase: After the validator has completed its work, it broadcasts the signed hash of its results. This signed hash is called the pre-commit. The hash format is H=hash (validationProof List_R), where validation Proof List is a list of the hash pairs serving as validation proofs for each file, and R is a randomly chosen nonce selected by the validator.

The validator then waits to collect the pre-commits for the other validators. Once the timeout period has been reached, it broadcasts its validProof List and its R value to publish its results. No additional pre-commits are accepted at this point. (If less than the minimum number of required signatures is received, it will rebroadcast and wait again).

The validator accepts the signatures of all other validators with valid proofs. provided that the other validators submitted valid pre-commits. Since the results are not publicly observable until after the results are completed, a freeloader is not able to provide a valid pre-commit. Each validator submits a transaction to the blockchain with its results. The smart contract accepts the first transaction it receives, and only the first. At this point, the blobber receives its reward and the validators receive payment for their work. The payout amount is pro-rated to match the total payout and the length of the contract. For instance, if blobber Bob's challenge pool contains 12 tokens from Alice for storage paid over a contract period of 90 days, and the first challenge happens at day 45, Bob receives 6 tokens for passing the challenge. If Bob is again challenged at day 60, Bob receives an additional 2 tokens. On day 90, Bob receives the remaining balance of 4 tokens.

The validators are paid in a pro-rated manner like the blobber is rewarded. An equal portion of the reward is set aside for every validator, even those that did not participate in the validation. However, the rewards are only distributed to validators who participated in the validation process; the reward for non-participating validators is burned. This design ensures that validators have no incentive to exclude each other; instead validators have a strong incentive to perform the validation work.

FIG. 1 depicts an example of an aggregate signing and verification systems with key split ups utilizing multi-client and device processing 100. In the example of FIG. 1, the environment includes a client 1 system 110, a client 2 system 112, . . . , a client n system 114. Each of the client systems, may be configured like Client 1 110 or may have a different configuration. In an implementation, the client system 1 110 includes components to request different key management operations. In one implementation, the client system 110 includes modules to start with a primary key and generate partially split keys that depend on the primary key. A client can implement many types of flexible and distributed applications on the client system 110 using the client aspect of the blockchain.

In one implementation, the device 1 120 and device 2 122 both belong to client 1 110. Client 1 110 sends its private key to device 1 120 to be split with device 2 122. One split key is stored on 120 and another split key is stored on 112. A Quick Response Code (QR) can be generated by comparing the split key to the primary key utilizing a QR code generating application. In one embodiment the two devices communicate with each other securely using public key verifications.

In an embodiment, Client 1 has a private key and a public key pair. The user has utilized the split key feature and set up split keys on multiple device. A first key is chosen for device 1 120, a second key for device 2 122, and a nth key for device n 124. A representation of the keys may be embedded in QR codes. In an embodiment, the split key from all the client devices (device 1 120, device 2 122, . . . , device n 124) are combined into one signature 128 for presentation into the blockchain network 140. In an embodiment, the client system 1 110 includes components to request different transactions using tokens. In one implementation, the client system 1 110 includes modules to buy tokens, lock tokens, earn interest tokens and spend tokens. A client can implement many types of flexible and distributed applications on the client system 1 110 using the client aspect of the blockchain. The client 1 110, may also share files and tokens with other clients and give permissions to other clients, for example, client 2 112, . . . , client n 114. With the appropriate permissions the other clients (client 112, . . . , client n 114) may make any or all types transactions such as send, swap, buy, sell, lock, stake, metadata, and data cruds, share, etc to the blockchain network 140. The blockchain network may process requests from multiple clients by aggregation, that is, aggregate messages between user/client 1, user client 2, . . . , user client n by combining signing by miners for user/client 1 130, aggregate user/client 2 signing by miners 132, . . . , aggregate user/client n signing by miners 134. Similarly, the validation may also include aggregate user/client 1 verification by miners 150, aggregate user/client 2 verification by miners 152, . . . , aggregate user/client n verification by miners 154.

In one implementation, the aggregate user/client 1 130 includes components, modules, and APIs to aggregate sign two or more messages received from different clients when the messages are signed with split keys and a short compressed signature is generated using two or more split keys.

Blockchain network 140 can be different wireless and wired networks available to connect different computer devices including client and server systems. In an implementation, network 140 is publicly accessible on the internet. In an implementation, network 140 is inside a secure corporate wide area network. In an implementation, network 140 allows connectivity of different systems and devices using a computer-readable medium. In an implementation, the block chain platform using the client system, the blobber, the sharder or the miner performs different key management, signing and verification functions.

The messaging and notification between different components can be implemented using application programming interface (API) calls, extensible markup language ("XML") interfaces between different interfaces, Java/C++ object oriented programming or simple web-based tools. Different components may also implement authentication and encryption to keep the data and the requests secure.

Figure 2:
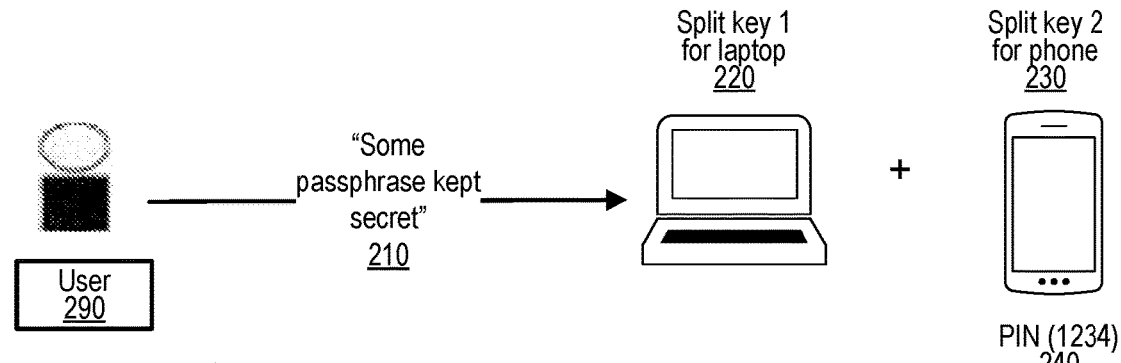
FIG. 2 depicts a schematic flow of spit keys kept across devices.
Figure 2:
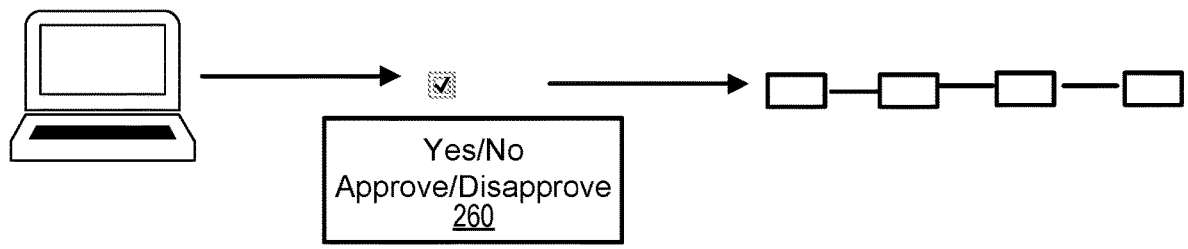

FIG. 2 depicts an example embodiment where split key is kept across devices 200. The user 290 needs to keep a private key (passphrase) secure. The user 290 chooses some passphrase to be kept secret 210. The passphrase 210 may become split key 1 which may be used to access some device, such as, laptop 220. The user 290 may also access a different device using a short key, for example, a PIN (1234) 240. The PIN may become Split key 2 for phone 230. The user 290 needs to keep private key (passphrase) secure. In this example embodiment, to send transactions, the user needs both the laptop 220 and a phone 230. The user 290 is not limited to 2 devices; instead, an arbitrary number may be supported. The user can approve or disapprove a request to add more devices by answering Yes or No to a prompt requesting additional devices 260. Using just the passphrase on the laptop, the user can receive transactions. With access to 2 of the devices (laptop and mobile), the user can send transactions 215.

Figure 3:
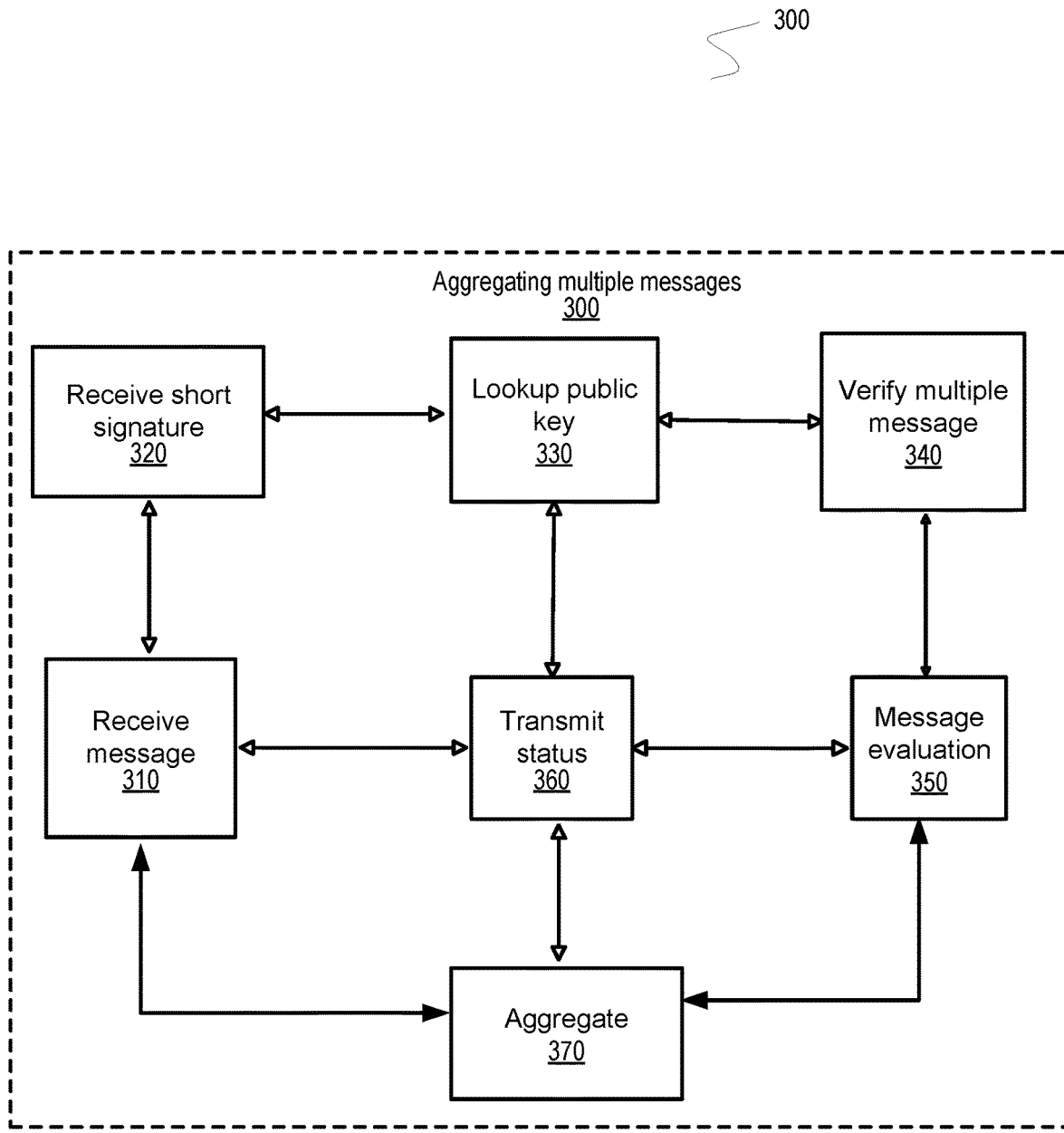
FIG. 3 depicts a schematic flow of aggregating multiple messages.

FIG. 3 depicts a schematic view of aggregating processing of multiple messages 300. At step 310, the process receives message. In an example embodiment, the message is sent from a first participant of a blockchain request to a second participant of a blockchain request. The first participant and the second participant may be a client or a service provider. Service providers include, but are not limited to, miners, blobbers, sharders, and validators. A message, may be for example, a request to create, read, update, or delete (CRUD) a block of data, indicate a proposed contract, and an acceptance of a proposed contract. At step 320, the process receives short signature from the first participant. Typically, the short signature may be built using a private key from the first participant and an encryption algorithm, such as, ECDSA. At step 330, the process looks up the public key of the first participant. At step 340, the process verifies if there are multiple message being processed. The process evaluates the message at step 350 to see if an aggregation is appropriate. At step 360, the results of the evaluation are included in a transmit of status. When it's determined that two or more valid messages are received, the signature and keys are aggregated at step 370. In an embodiment, the look up of public key may be based on client identification registration database that stores different public keys for clients.

Figure 4:
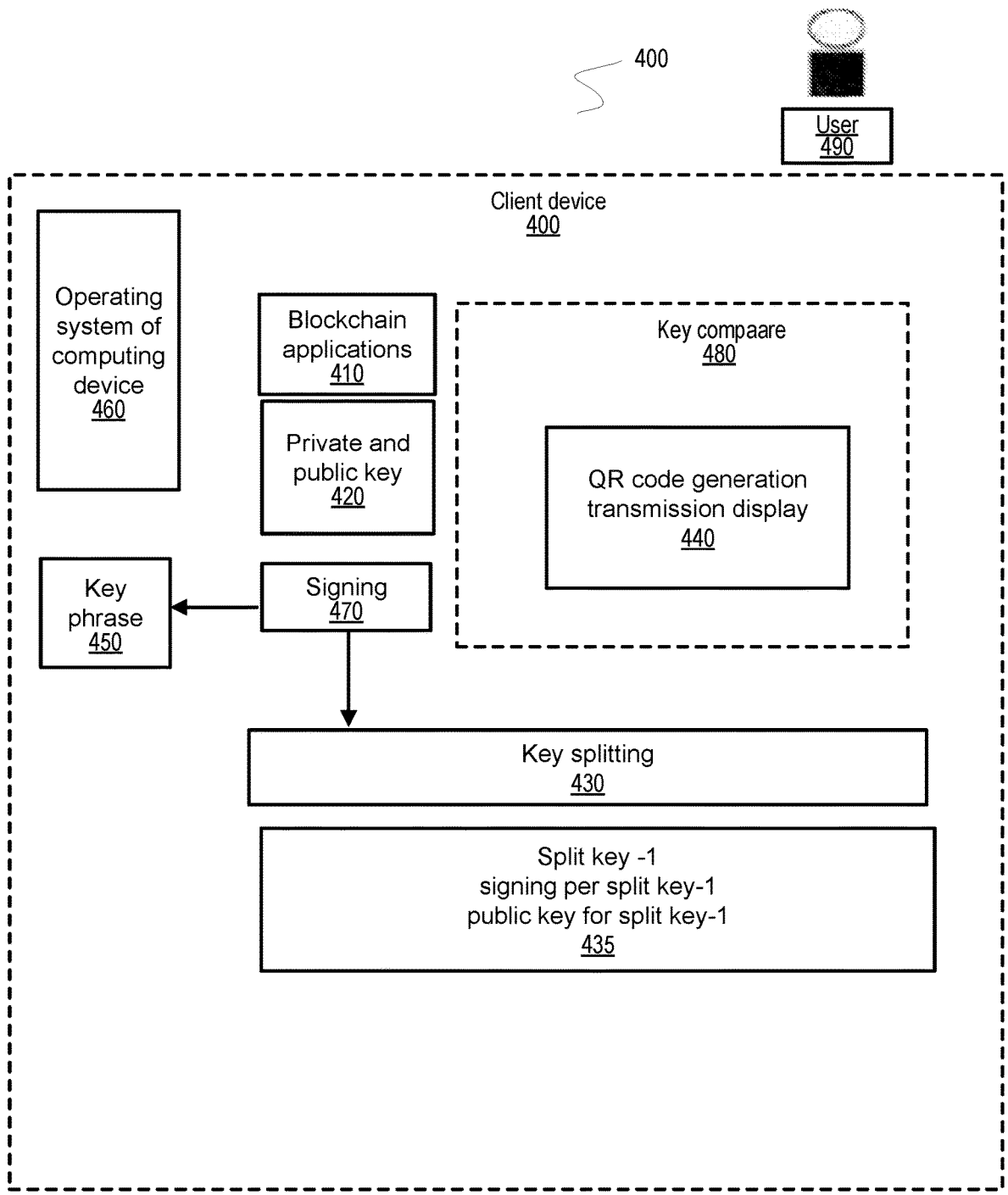
FIG. 4 depicts an embodiment of a client device.

FIG. 4 is an exploded view of a client 1 110 shown in FIG. 1, client device 400. For a blockchain for automated client key management, the client has blockchain applications 410 that interact with the operating system 460 of the client computing device. The client manages security of different blockchain applications using private and public key pair 420. A client may also use a key phrase or mnemonic 450. Signing a message is an operation triggered at 470. The client may invoke key splitting 430 that includes key compare 480 and QR code generation transmission display 440. The key split operation 430, may be supported recursively by using a previous split key, indicated by split key-1, a previous signing per split key, indicated by signing per split key-1, and a previous public key, indicated by public key for split key-1 435. The signing may use one of the split keys and include generating public key for the split key. Key verification and comparison allows the client device 400 to verify the received messages, generate a quick response code, transmit the code and display the code as needed for different applications for a user 490 using the client device 400.

Figure 5:
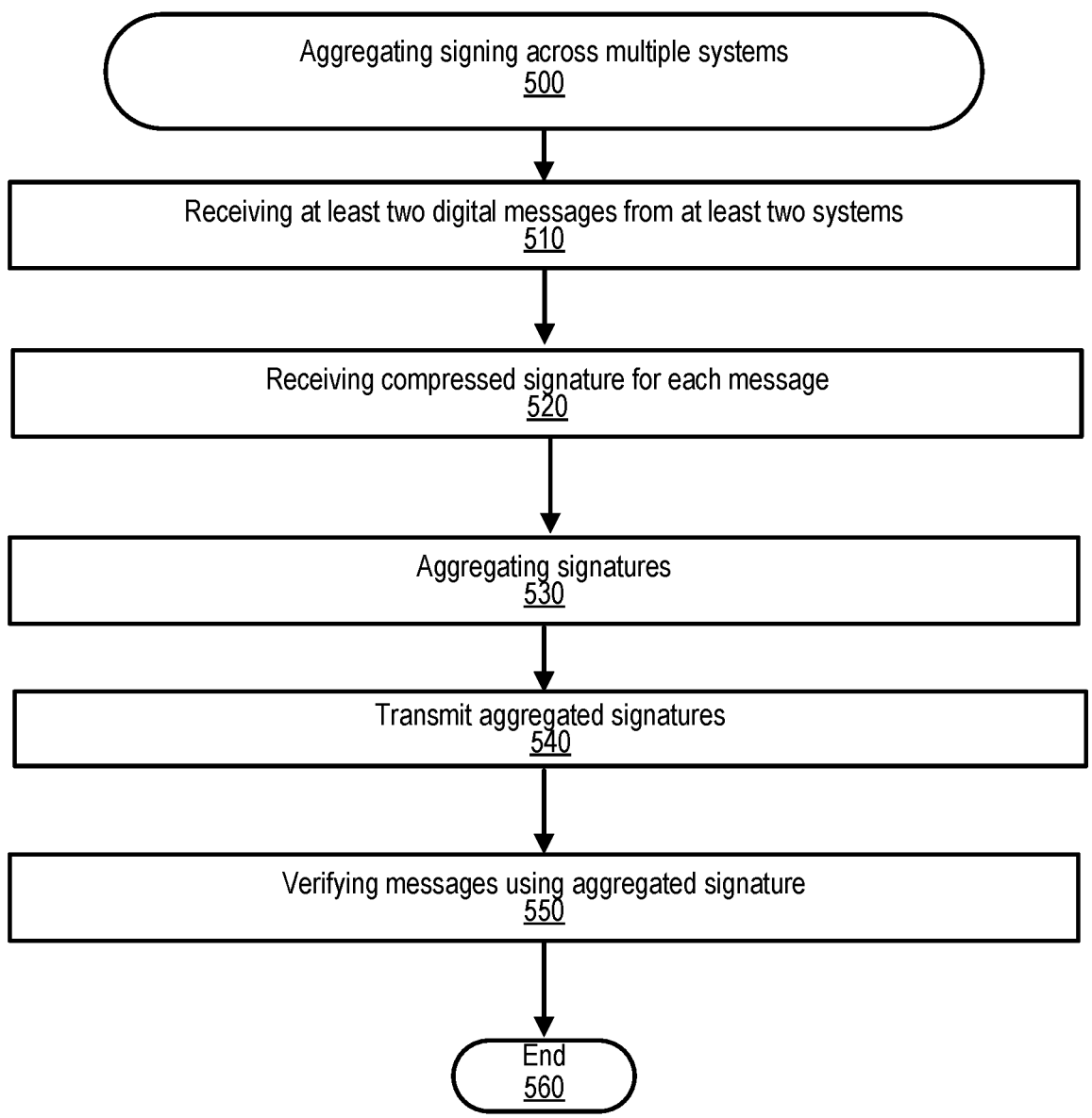
FIG. 5 depicts a flowchart illustrating aggregating signing across multiple systems.

FIG. 5 processing commences at 500 and shows the steps taken by a process that aggregates signing of multiple digital signatures simultaneously using key splitting. The flowchart 500 is discussed in conjunction with the blockchain platform environment shown in the client device diagram 400 in FIG. 4. At step 510, the process receives at least two digital messages from at least two clients. The client privateKey generates splitKey1 and splitKey2 which is stored in device1 and device2, where in an embodiment the privateKey is deleted after creation of the split keys after keeping the private key in a safe place. The client then combines the signatures of the messages from device1 and device2 and forms a single signature of the message which it sends to the blockchain system. The combined signature represents the same entity if the message were to be signed by the original private key. At step 520, the process receives compressed signature for each message. At step 530, the process aggregates signatures. At step 540, the process transmits aggregated signatures. At step 550, the process verifies messages using aggregated signature. FIG. 5 processing thereafter ends at 560.

Figure 6:
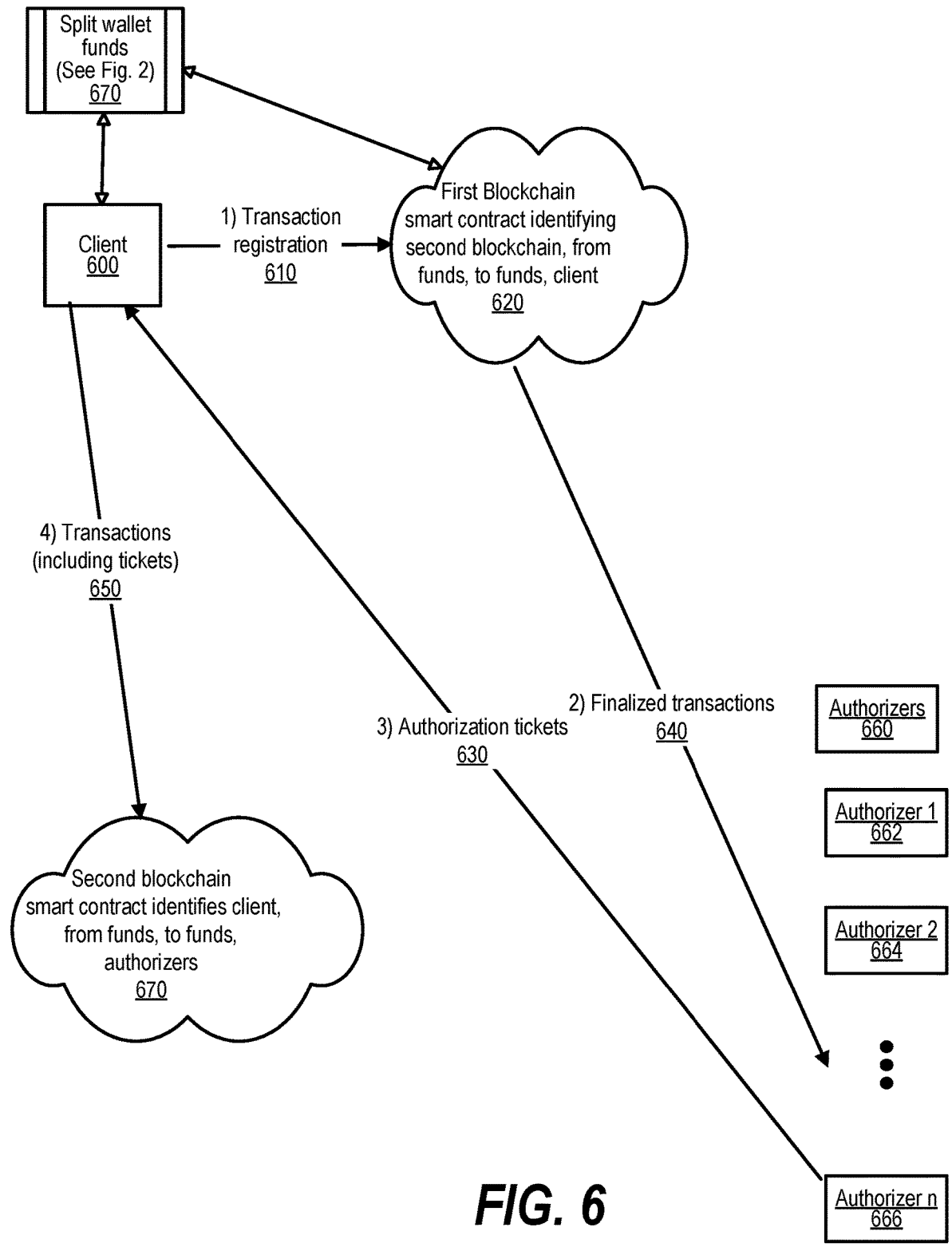
FIG. 6 depicts a schematic flow of an embodiment for utilizing split wallet funds across two blockchain systems.

FIG. 6 shows the steps taken by a client 600 utilizing split wallet funds (See FIG. 2 and corresponding text) to convert funds from a first blockchain system to a second blockchain system. Any client account may be used and any wallet functionality may be used. At step 610, the client initiates a transaction registration by invoking a first blockchain smart contract identifying a second blockchain, from funds, to funds, and the client 620. The smart contract identifies a set of authorizers 660, authorizer 1 662, authorizer 2 664, . . . , authorizer n 666. At step 640, the finalized transactions is sent to the authorizers 660. The authorizers 660, may be, for example, validators. At step 630, the authorization tickets are sent to the client 600. At step 650, client sends a transaction to the second blockchain, which includes the authorization ticket with signatures of the authorizers. At step 670, the second blockchain smart contract identifies the client, the from funds, the to funds, and the authorizers to determine the disposition of the fund. An exchange rate must be determined, that is an equivalence between a first quantity of funds in a first currency denomination and a second quantity of funds in a second currency denomination on the second blockchain platform. The exchange rate may be determined by identifying an equivalence to a common exchange medium, for example US dollars. In an embodiment, the exchange may be accomplished by ensuring the converted funds are not usable when replacement fund are usable on the second blockchain platform. This may be accomplished by provably destroying or burning the first quantity of funds in the first currency denomination.

In an embodiment, the second blockchain also bears responsibility for tying the account identities together. Even if a client acquires sufficient authorization tickets, the request will be denied if the first blockchain account does not map to the second blockchain account.

For the disclosed design to work correctly, the second blockchain must have support for sophisticated smart contracts. Specifically, second blockchain smart contracts must be able to hold funds, track balances, and to recognize when the release of these funds is authorized by the proper entity. To secure their second blockchain coins, the client transfers their funds to a smart contract on the second blockchain. The smart contract tracks the balance of the user's account and releases the coins only when authorized by a first blockchain. This smart contract may be called the second blockchain bank. The client must also have a first blockchain account and wallet, and it must register with the first blockchain smart contract. However, this workload is a one-time event, and does not need to be repeated even if the user wishes to secure multiple coins.

As part of the registration process, the second blockchain records the client's first blockchain account. Depending on the blockchain additional details may need to be stored. By giving responsibility for connecting the first blockchain's account to the second blockchain account, the complexity is minimized for the first blockchain. To release funds in the disclosed system, a client writes a transaction to the first blockchain. Special authorizers monitor the blockchain and provide tickets to the client authorizing the release of the client's funds. The client can then call the second blockchain bank smart contract, called the second blockchain smart contract with these tickets to release their funds.

The security of the disclosed system depends on the authorizers. To reduce the risk, M/N signatures are required to release funds, where M and N represent the required and total number of authorizers respectively.

FIG. 6 shows the process for releasing funds from the second blockchain wallet. The steps are detailed below:

The client may use support if available, of a split-key wallet and writes a transaction to the authorization smart contract on the first blockchain's blockchain authorizing the second blockchain transaction. When called, the authorization smart contract provides:

1) The name of the second blockchain.
2) The amount of funds to be converted or burned.
3) The amount of second blockchain coins to acquire.
4) The 'from' address, belonging to the client.
5) The 'to' address, which will receive the acquired coins. The acquired coins are determined by an exchange rate from representing the value of the client fund on the first blockchain platform being exchanged for an equal value of funds on the second blockchain platform.
6) A sequential nonce.

The authorizers monitor the blockchain for finalized transactions to the authorization smart contract. Once the authorizers verify the validity of the transaction, they send the client authorization tickets. These tickets contain all of the information from the first blockchain contract, as well as a signature and the client's first blockchain account ID. The client collects the tickets and calls the second blockchain bank smart contract, providing the authorization tickets. The second blockchain bank verifies the tickets; if it has received M/N valid tickets, the second blockchain bank transfers funds to the address specified in the tickets.

1) For the authorization tickets, the second blockchain bank must verify that:
2) The signatures are valid.
3) The nonces of the tickets match and are greater than the most recently received nonce.
4) The first blockchain account maps to the second blockchain account.
5) The second blockchain account authorization tickets match in the fields taken from the authorization contract. The first blockchain smart contract does not track funds on the second blockchain, but verifies the user's request. This design maximizes the first blockchain's flexibility, since a single authorization smart contract is sufficient for all other blockchains, provided that those chains do not require any specialized field.

Handling Failures

One question that might arise is how to handle failure cases. For instance, if the client's machine fails in the middle of the protocol, they may be unable to collect the needed authorization tickets. Fortunately, in this case or similar failure cases, the protocol can be repeated without adverse effect. Neither the first blockchain miners nor the authorizers track the client's balance on second blockchain.

In an embodiment, the client machine might crash and be unable to collect the proof-of-burn tickets. In this case, it is possible for the client to request replacement tickets from the authorizers. This may occur when the client provides the transaction burning the funds. The authorizers must verify that the transaction had been accepted before re-issuing the tickets.

Note that the second blockchain bank smart contract does not require that the nonces of tickets are received in order, but only that each nonce is greater than the nonce used for previous attempts. Therefore, if a request fails and the process needs to be repeated, no special handling is required—the process can simply be repeated.

Paying/Punishing the Authorizers

Each authorizer must stake some amount of currency to join the set of authorizers. Authorizers are selected via the first blockchain governance protocol.

Whenever a client writes a transaction to the first blockchain requesting the release of second blockchain funds, an extra transaction fee is set aside for the active authorizers. This amount is selected by the governance protocol and non-negotiable by either party.

If an authorizer signs an authorization ticket without a matching transaction on the first blockchain, the ticket may be used as proof of malicious behavior. Any entity can submit a transaction to the first blockchain with this ticket; the authorizer will lose its staked tokens and be ejected from the authorizer set. Similarly, when a proof-of-burn ticket from the authorizer is included in a call to the first smart contract, the authorizers are paid in either the first smart contract or the second smart contract. Again, the amount of these transaction fees are specified in the smart contract and may be non-negotiable. If an authorizer attempts to abuse their position by writing bogus tickets for the client, any entity can send the bogus ticket to the other authorizers. The authorizers then verify the behavior and sign a proof-of-malfeasance ticket. These tickets can then be gathered and sent in a transaction to the first block chain miners, who will eject the authorizer and seize their stake, dividing it among the reporting entity and the authorizers who signed the ticket. Likewise, the tickets can be sent to the second smart contract, which will likewise eject the authorizer and divide up the staked.

Figure 7:
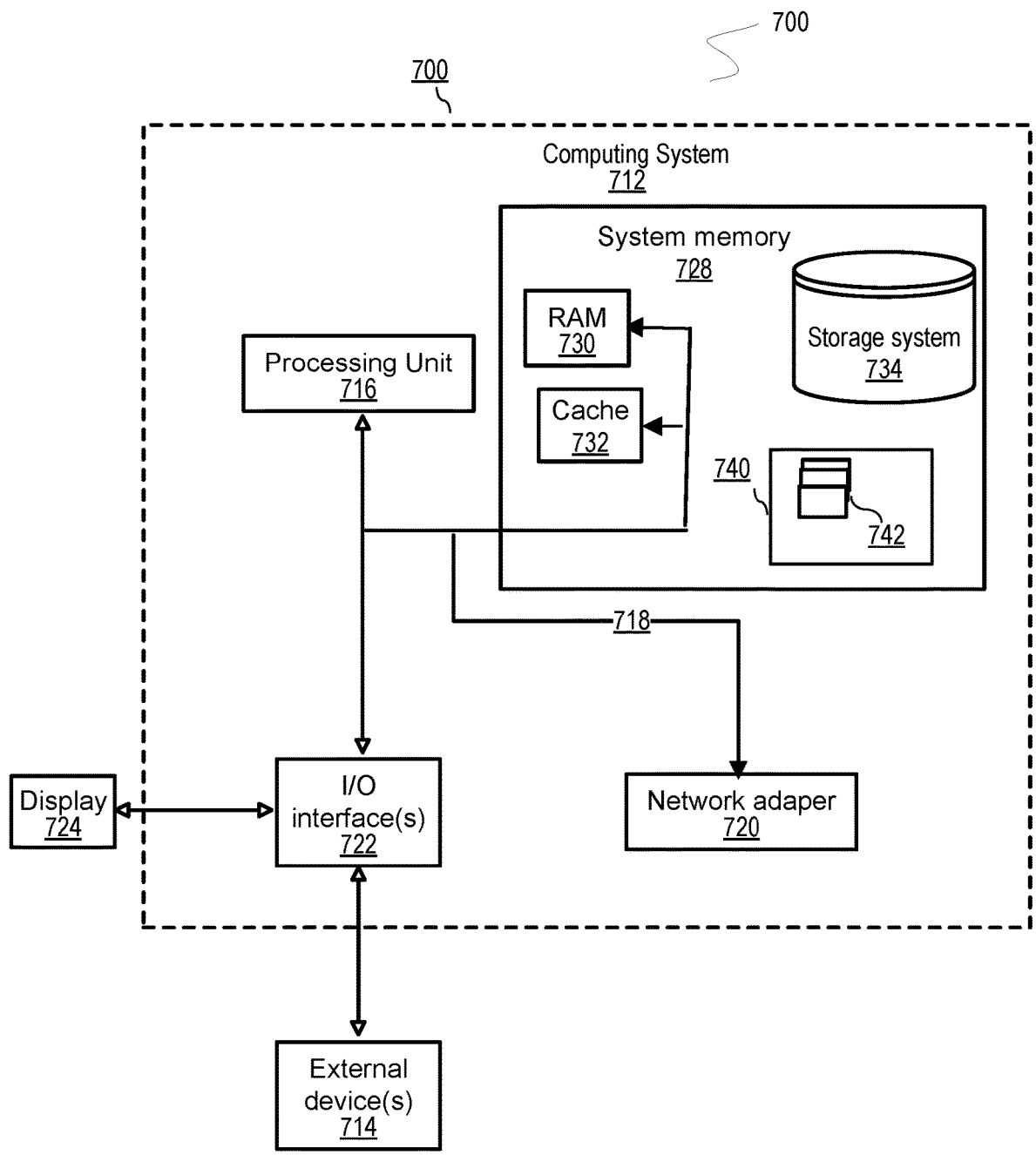
FIG. 7 depicts a schematic view of a processing system wherein the methods of this invention may be implemented.

Referring to FIG. 7, a schematic view of a processing system 700 is shown wherein the methods of this invention may be implemented. The processing system 700 is only one example of a suitable system and is not intended to suggest any limitation as to the scope of use or functionality of embodiments of the invention described herein. Regardless, the system 700 can implement and/or performing any of the functionality set forth herein. In the system 700 there is a computer system 712, which is operational with numerous other general purpose or special purpose computing system environments or configurations. Examples of well-known computing systems, environments, and/or configurations that may be suitable for use with the computer system 712 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 712 may be described in the general context of computer system-executable instructions, such as program modules, being executed by a computer system. Generally, program modules may include routines, programs, objects, components, logic, data structures, and so on that perform tasks or implement abstract data types. The computer system 712 may be practiced in distributed cloud computing environments where tasks are performed by remote processing devices that are linked through a communications network. In a distributed cloud computing environment, program modules may be in both local and remote computer system storage media including memory storage devices.

As shown in FIG. 7, the computer system 712 in the system environment 700 is shown in the form of a general-purpose computing device. The components of the computer system 712 may include, but are not limited to, a set of one or more processors or processing units 716, a system memory 728, and a bus 718 that couples various system components including the system memory 728 to the processor 716.

The bus 718 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnects (PCI) bus.

The computer system 712 typically includes a variety of computer system readable media. Such media may be any available media that is accessible by the computer system 712, and it includes both volatile and non-volatile media, removable and non-removable media.

The system memory 728 can include computer system readable media in the form of volatile memory, such as random-access memory (RAM) 730 and/or a cache memory 732. The computer system 712 may further include other removable/non-removable, volatile/non-volatile computer system storage media. By way of example only, a storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 718 by one or more data media interfaces. As will be further depicted and described below, the system memory 728 may include at least one program product having a set (e.g., at least one) of program modules 742 that are configured to carry out the functions of embodiments of the invention.

A program/utility 740, having the set (at least one) of program modules 742, may be stored in the system memory 728 by way of example, and not limitation, as well as an operating system, one or more application programs, other program modules, and program data. Each of the operating systems may have one or more application programs, other program modules, and program data or some combination thereof, and may include an implementation of a networking environment. The program modules 742 generally carry out the functions and/or methodologies of embodiments of the invention as described herein.

The computer system 712 may also communicate with a set of one or more external devices 714 such as a keyboard, a pointing device, a display 724, a tablet, a digital pen, etc. wherein these one or more devices enable a user to interact with the computer system 712; and/or any devices (e.g., network card, modem, etc.) that enable the computer system 712 to communicate with one or more other computing devices. Such communication can occur via Input/Output (I/O) interfaces 722. These include wireless devices and other devices that may be connected to the computer system 712, such as, a USB port, which may be used by a tablet device (not shown). Still yet, the computer system 712 can communicate with one or more networks such as a local area network (LAN), a general wide area network (WAN), and/or a public network (e.g., the Internet) via a network adapter 720. As depicted, a network adapter 720 communicates with the other components of the computer system 712 via the bus 718. It should be understood that although not shown, other hardware and/or software components could be used in conjunction with the computer system 712. Examples include, but are not limited to microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method that includes a processor and a local storage device accessible by the processor to transfer a client's funds registered on a first blockchain platform to replacement funds registered on a second blockchain platform comprising:

invoking a first smart contract identifying the second blockchain platform, the client's funds as a from fund on the first blockchain platform, the replacement funds as a to fund on the second blockchain platform, and authorizers on the first blockchain platform authorizing a second smart contract on the second blockchain platform and wherein the second smart contract controls access to the replacement funds on the second blockchain platform;

responsive to receiving an indication of a completion of the first smart contract, sending a plurality of client's authorization tickets indicating a results of the completion to the second smart contract; and processing the results of the completion by the second smart contract.

2. The method of claim 1, wherein the first smart contract identifies an amount of the client's funds registered on the first blockchain platform and an amount of the replacement funds on the second blockchain platform.

3. The method of claim 2, wherein an exchange rate is used to determine the replacement funds from the amount of the client's funds.

4. The method of claim 3, wherein the first smart contract includes information.

5. The method of claim 4, wherein the information includes a name of the second blockchain platform, the amount of the funds on the first blockchain platform to eliminate, an address of the client, a receiving address to receive the replacement funds, a nonce, and an authorizer signature.

6. The method of claim 5, further comprising:
monitoring by a set of authorizers for a finalizing transaction providing an indication of a successful completion of the first smart contract.

7. The method of claim 6, further comprising:
responsive to detecting the finalizing transaction, sending the information and a signature to the second smart contract.

8. The method of claim 7, wherein a set of authorizers' wager funds and receive a compensation based on a service\s provided.

9. The method of claim 8, wherein a good performance by the authorizers returns the wagered funds and an interest on the wagered funds and wherein a poor performance causes a loss of at least a portion of the wagered funds.

10. The method of claim 9, wherein the poor performance is due to an authorizer writing a bogus ticket for the client and further comprises:
sending the bogus ticket by an entity to other authorizers;
signing a proof-of-malfeasance tickets by the other authorizers;
sending the proof-of-malfeasance tickets in a transaction to the first blockchain miners;
ejecting the authorizer;
seizing the wagered funds; and
distributing the seized wagered funds between the entity and the other authorizers.

11. The method of claim 1, wherein a failure condition in the second smart contract is processed by resending the plurality of client's authorization tickets to the second smart contract.

12. The method of claim 1, further comprising:
receiving by the second smart contract a set of authorization information;
recording by the second smart contract the set of authorization information;
delaying processing the results of the completion by the second smart contract until a set of authenticated authorization tickets exceeding a predetermined threshold is received by the second smart contract.

13. The method of claim 12, wherein the set of authorization information includes an account identification of a client on the first blockchain platform, a set of authorization signatures, a from account, a to account, an information field, and a nonce.

14. The method of claim 13, wherein the authorization further comprises:
validating the signatures of the authorization tickets;
validating nonces of the authorization tickets match or are greater than a most recently received nonce;
validating the from account;
validating the to account; and
validating the information field.

15. An information handling system to transfer a client's funds registered on a first blockchain platform to replacement funds registered on a second blockchain platform comprising:
one or more processors;
a memory coupled to at least one of the processors;
a network interface that connects a local device to one or more remote web sites; and
a set of computer program instructions stored in the memory and executed by at least one of the processors in order to perform actions comprising:
invoking a first smart contract identifying the second blockchain platform, the client's funds as a from fund on the first blockchain platform, the replacement funds as a to fund on the second blockchain platform, and authorizers on the first blockchain platform authorizing a second smart contract on the second blockchain platform and wherein the second smart contract controls access to the replacement funds on the second blockchain platform;
responsive to receiving an indication of a completion of the first smart contract, sending a plurality of client's authorization tickets indicating a results of the completion to the second smart contract; and
processing the results of the completion by the second smart contract.

16. The information handling system of claim 15, wherein the first smart contract identifies an amount of the client's funds registered on the first blockchain platform and an amount of the replacement funds on the second blockchain platform.

17. The information handling system of claim 16, wherein an exchange rate is used to determine the replacement funds from the amount of the client's funds.

18. The information handling system of claim 17, wherein the first smart contract includes information.

19. The information handling system of claim 18, wherein the information includes a name of the second blockchain platform, the amount of the funds on the first blockchain platform to eliminate, an address of the client, a receiving address to receive the replacement funds, a nonce, and an authorizer signature.

20. The information handling system of claim 19, further comprising:
monitoring by a set of authorizers for a finalizing transaction providing the indication of the successful completion of the first smart contract.

21. The information handling system of claim 20, further comprising:
responsive to detecting the finalizing transaction, sending the information and a signature to the second smart contract.

22. The information handling system of claim 21, wherein the set of authorizers' wager funds and receive a compensation based on a services provided.

23. The information handling system of claim 22, wherein a good performance by the authorizers return the wagered funds and an interest on the wagered funds and wherein a poor performance causes a loss of at least a portion of the wagered funds.

24. The information handling system of claim 23, wherein the poor performance is due to an authorizer writing a bogus ticket for the client and further comprises:
  sending the bogus ticket by an entity to other authorizers;
  signing a proof-of-malfeasance tickets by the other authorizers;
  sending the proof-of-malfeasance tickets in a transaction to the first blockchain miners;
  ejecting the authorizer;
  seizing the wagered funds; and
  distributing the seized wagered funds between the entity and the other authorizers.

25. The information handling system of claim 15, wherein a failure condition in the second smart contract is processed by resending the plurality of client's authorization tickets to the second smart contract.

26. The information system of claim 15, further comprising:
  receiving by the second smart contract a set of authorization information;
  recording by the second smart contract the set of authorization information; and
  delaying processing the results of the completion by the second smart contract until a set of authenticated authorization tickets exceeding a predetermined threshold is received by the second smart contract.

27. The information system of claim 26, wherein the set of authorization information includes an account identification of a client on the first blockchain platform, a set of authorization signatures, a from account, a to account, an information field, and a nonce.

28. The information system of claim 27, wherein the authorization further comprises:
  validating the signatures of the authorization tickets;
  validating nonces of the authorization tickets match or are greater than a most recently received nonce;
  validating the from account;
  validating the to account; and
  validating the information field.

* * * * *